United States Patent [19]
Furuya et al.

[11] Patent Number: 5,305,011
[45] Date of Patent: Apr. 19, 1994

[54] AUTOMOTIVE DISPLAY APPARATUS

[75] Inventors: Yoshiyuki Furuya; Tadashi Iino, both of Shizuoka, Japan

[73] Assignee: Yazaki Corporation, Tokyo, Japan

[21] Appl. No.: 861,689

[22] Filed: Apr. 1, 1992

[30] Foreign Application Priority Data

Apr. 5, 1991 [JP] Japan ............... 3-021715[U]

[51] Int. Cl.$^5$ ............................................... G09G 3/02
[52] U.S. Cl. .......................................... 345/7; 340/980
[58] Field of Search ................. 340/705, 980, 461; 353/13, 14; 359/630, 631, 632, 633

[56] References Cited

U.S. PATENT DOCUMENTS

| 4,804,836 | 2/1989 | Iino ................ | 340/705 |
| 5,157,549 | 10/1992 | Suzuki et al. ........ | 340/705 |

Primary Examiner—Ulysses Weldon
Assistant Examiner—Doon Chow
Attorney, Agent, or Firm—Armstrong, Westerman, Hattori, McLeland & Naughton

[57] ABSTRACT

An automotive display apparatus of the head-up display type which provides a freedom in selecting the setting position of an indicator and which provides a good remote display. An indicator 1 is installed in a dashboard 3. An opening 3c is formed through an upper portion of the dashboard 3 for allowing light from the display of the indicator 1 to pass therethrough and be reflected by the windshield 2 toward the driver's viewing point 6. A transparent face plate 7 is disposed between the indicator 1 and the opening 3c. Further, a defroster duct 8 is arranged inside the dashboard 3. The opening 3c is also used as an outlet opening of the defroster duct 8. When a defroster switch is turned on, the air passes through the duct 8 and ascends along the face plate 7 to be blown at the surface of the windshield 2 through the opening 3c in the dashboard.

7 Claims, 3 Drawing Sheets

AUTOMOTIVE DISPLAY APPARATUS

BACKGROUND OF THE INVENTION

1. Field of the Invention

The present invention relates to an automotive display apparatus in which a display image of an indicator installed in a dashboard is directed toward a windshield through an opening formed in a dashboard, which windshield in turn reflects the image toward a driver's viewing point so that the driver can see a virtual image of the indicator display at a location in front of the windshield.

2. Prior Art

Automotive display apparatuses of the type in which a display image of an indicator is directly viewed are generally used. In these apparatuses, an indicator is located on the driver's side of a dashboard for providing information on vehicle running conditions. A drawback to these apparatuses is that the driver must largely shift his eyes each time he checks the display of the indicator, resulting in the driver interrupted in seeing the outer field ahead of the vehicle. Especially when driving at a high speed, a driver looks far ahead, and thus the amount of focus shift of the driver's eyes becomes correspondingly large.

With a view to reducing the amount of focus shift of the driver's eyes when he checks the display, a head-up display apparatus has been proposed and put in use. FIG. 3 shows one example of such a head-up display apparatus. This apparatus comprises an indicator 1 such as a fluorescent display tube installed in a dashboard 3 with its display surface directed upwardly. The light from the display of the indicator passes through an opening 3a formed in the dashboard 3 and is reflected by a reflection-treated reflective surface 2a on the windshield 2 toward a driver's viewing point 6 so that the driver can see a virtual image X of the display at a location in front of the windshield 2 in an overlapping manner with the outer field. In the figure, denoted 5 is a bonnet.

A vehicle is generally further provided with a defroster for evaporating and removing the frost (moisture) adhering to the inner surface of the windshield to secure a clear forward view. In the case of a head-up display apparatus such as that mentioned above, in which the surface of a windshield is used as a reflective surface for light from the display of an indicator, a defroster is especially needed. This is because frost on the windshield not only deteriorates a forward view, but also hinders the driver's viewing the virtual display image of an indicator. Thus, as shown in FIG. 3, hot air is led to the opening 3b through the duct 4 and blown therefrom at the surface of the windshield 2 to evaporate the frost thereon.

In addition, JP Utility Model Application Laid-open Specification No. 56080/1985 proposes a head-up display apparatus in which the indicator displaying information on vehicle running conditions is constituted by a light-transmission type liquid crystal display element. In this apparatus, the air having been used to cool the light source is introduced into a defroster duct to make use of the air to defrost the windshield.

In either case, however, two openings are formed in the surface plate of the dashboard, one being an outlet opening of the defroster duct and the other for allowing display light to pass therethrough. This results in restrictions on where to install the indicator. For example, when the forming location of a virtual image is desired to be changed so that the driver's line of sight is shifted from 6a to 6b as shown in FIG. 4, since the angle at which the windshield is provided is predetermined in accordance with the vehicle's model, it is necessary to change the location of the indicator. Moving the indicator to a forward position, however, is impossible, prevented by a wall of the duct.

Further, the surface of an indicator is apt to gather dust, frost and the like, resulting in distortions in the virtual display image. Provision of a transparent glass plate or the like over the display surface of the indicator, e.g., at an opening of the dashboard would involve the troublesome work of wiping the dust, frost and the like off the plate each time when necessary.

SUMMARY OF THE INVENTION

It is an object of this invention to provide an automotive display apparatus of the head-up display type which provides a freedom in selecting the setting position of the indicator and which provides a good remote display.

To achieve the above objective, an automotive display apparatus of this invention comprises: an indicator installed in a dashboard for displaying information on vehicle running conditions; an opening provided through an upper portion of the dashboard for allowing light from the display of the indicator to pass therethrough and be reflected by the inner surface of the windshield toward a viewing point of a driver; and a transparent face plate disposed between the indicator and the opening in the dashboard such that the face plate and portions of the dashboard confronting the face plate constitute part of a defroster duct for defrosting the windshield, whereby defroster air ascends along the face plate and is blown at the surface of the windshield through the opening in the dashboard.

With the construction as mentioned above, light from the display of the indicator is transmitted through the transparent face plate and proceeds through the opening in the dashboard to be reflected by the surface of the windshield toward the driver's viewing point. Accordingly, when viewed from the driver's viewing point, a virtual image of the indicator display is viewed at a location in front of the windshield in an overlapping manner with the outer field. Further, when the inner surface of the windshield is frosted due to a change, etc. in the temperature, humidity or the like in the car cabin and when a defroster switch is turned on, air is supplied through the defroster duct and ascends along the face plate to be blown at the surface of the windshield through the opening in the dashboard. Consequently, the surface of the windshield is defrosted and, at the same time, the dust, frost and the like adhering to the surface of the face plate are also removed.

PREFERRED EMBODIMENTS OF THE INVENTION

Figure 1:
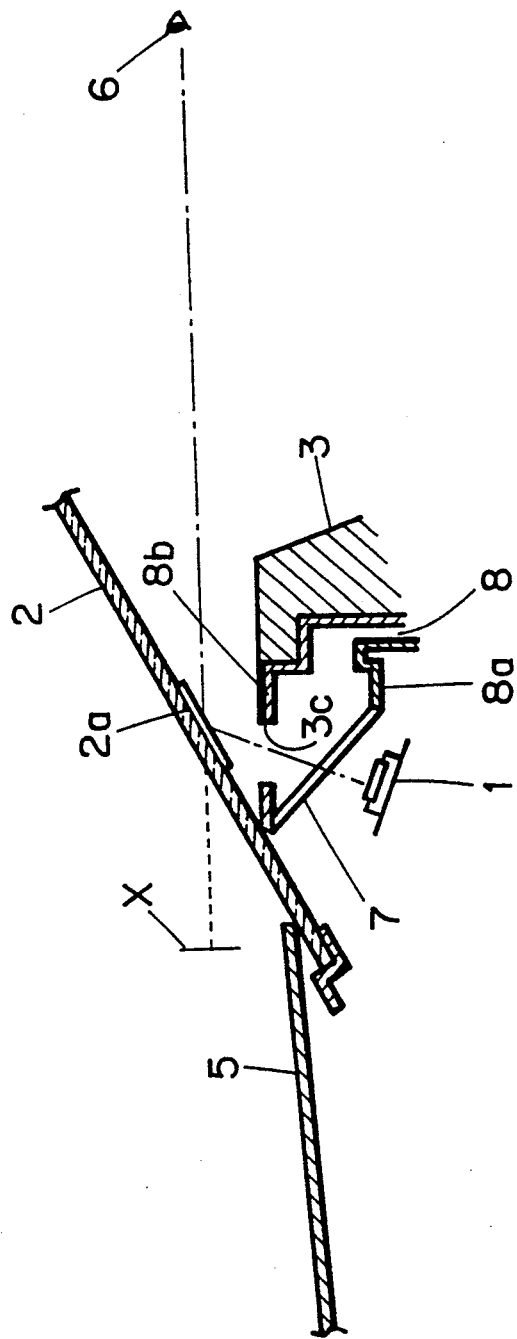
FIG. 1 is a schematic side view showing an automotive display apparatus according to one embodiment of this invention.

In the following, embodiment of an automotive display apparatus according to the present invention will be described with reference to the drawings. Components identical with those of the previously described prior art display apparatus are given like reference numerals.

FIG. 1 shows an embodiment of this invention, and in the figure, reference numeral 1 denotes an indicator constituted by a fluorescent display tube. The indicator 1 is installed in a dashboard 3 with its display surface directed upwardly. An opening 3c is formed in the upper portion of the dashboard 3, and light from the display of the indicator 1 passes through the opening 3c and is reflected by the surface of the windshield toward a viewing point 6 of a driver.

Disposed between the indicator 1 and the opening 3c is a heat-resistant transparent face plate 7 of acrylic resin, which keeps the indicator 1 from being exposed to the surroundings. The face plate 7 serves to keep the indicator 1 free from dust and the like. The face plate 7 is inclinedly installed with its front and rear portions with respect to the longitudinal direction of the vehicle raised and lowered, respectively. The front portion of the face plate 7 is secured to the underside of the dashboard 3. The face plate 7 is formed from a heat-resistant transparent acrylic resin in the present embodiment, but it may also be formed from transparent glass.

Further, a defroster duct 8 is installed in the dashboard 3, on the driver's side as compared with the location at which the indicator 1 is installed. The duct 8 rises roughly vertically inside the dashboard 3 and is bent toward the face plate 7 at its upper bent portions 8a, 8b, which are respectively secured to the rear end the face plate 7 and to the dashboard 3.

Thus, the upper bent portions 8a, 8b of the duct 8 and the face plate 7 and the portion of the dashboard 3 in the vicinity of the opening 3c are joined to each other to form part of the duct 8. When defroster air is supplied from below the duct 8, the air passes through the bent portions 8a, 8b of the duct 8 and ascends along the face plate 7 to be blown at the surface of the windshield 2 from the opening 3c of the dashboard 3.

With the construction as mentioned above, the light from the display of the indicator 1 is transmitted through the transparent face plate 7 of acrylic resin and proceeds through the opening 3c of the dashboard 3 to be reflected by a reflective surface 2a of the windshield 2 toward the driver's viewing point 6. Consequently, when viewed from the driver's viewing point 6, a virtual image of the display is seen at a location in front of the windshield 2 in an over-lapping manner with the outer field.

When the inner surface of the windshield 2 has been frosted due to a change in the temperature, humidity, etc. in the car cabin and when a defroster switch has been turned on, air passes through the defroster duct 8 and ascends along the surface of the face plate 7 to be blown at the windshield 2 through the opening 3c of the dashboard 3. Owing to the above, the surface of the windshield 2 is defrosted and, at the same time, dust and the like adhering to the surface of the face plate 7 are blown away and removed.

Figure 2:
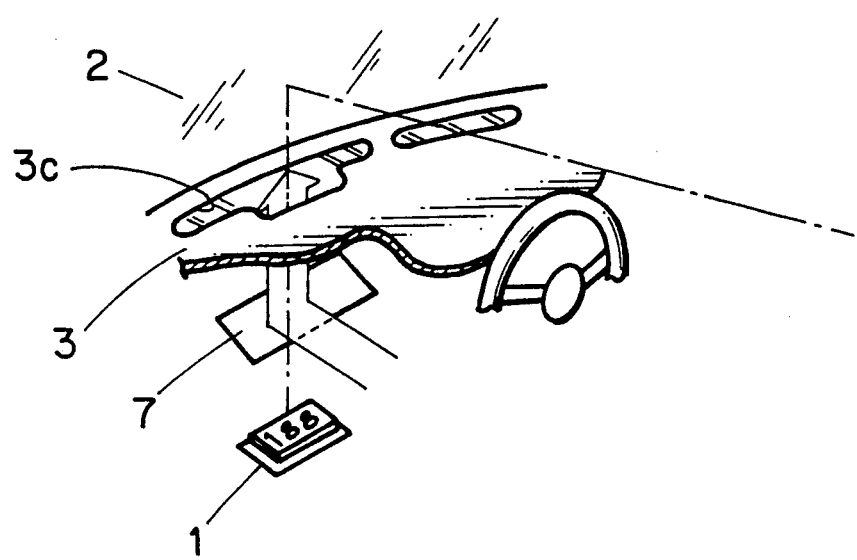
FIG. 2 is a schematic perspective view showing light from the display and defroster air passing through the same opening formed in the dashboard.
Figure 3:
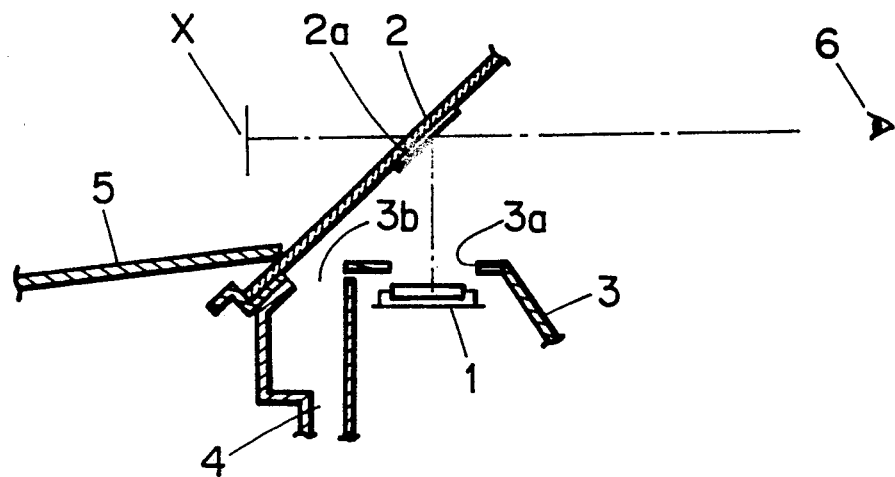
FIG. 3 is a schematic side view showing a conventional display apparatus.
Figure 4:
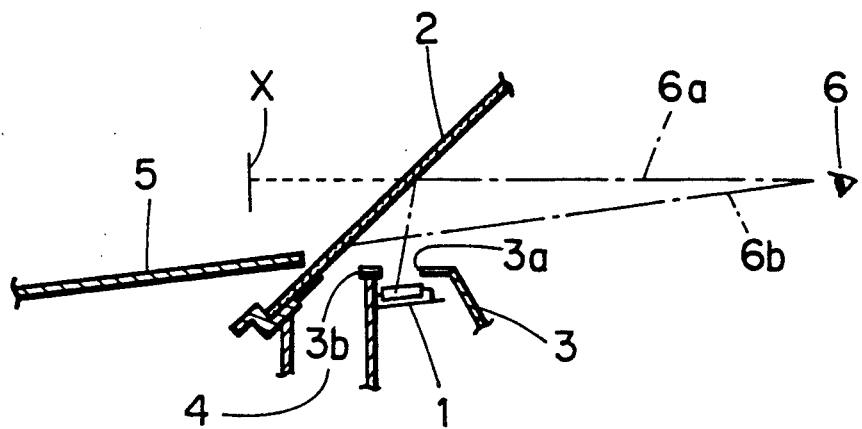
FIG. 4 is a schematic side view showing a defect to the conventional display apparatus.

FIG. 2 illustrates a state in which light from the display of the indicator 2 transmits through the face plate 7 to be reflected by the windshield 2, along with a state in which the air from below the duct 8 is blown at the surface of the windshield 2 through the opening 3c of the dashboard 3.

As described above, in the automotive display apparatus of the invention, the opening formed in the dashboard for allowing display light to pass therethrough is also used as an outlet opening for the defroster air. This results in a sufficient space for instrumenting and provides a freedom in selecting the setting position of the indicator 1 depending upon the information which the formed virtual image is to convey. Further, the dust and the like adhering to the surface of the face plate can be quickly removed by the air from the defroster duct, which air also serves to remove the frost on the surfaces of the windshield and the face plate, resulting in a good quality display always provided.

What is claimed is:

1. An automotive display apparatus comprising:
   an indicator installed in a dashboard for displaying information on driving conditions;
   a defroster duct defining a defrost air passage and installed within the dashboard for defrosting a windshield;
   wherein the dashboard has an opening provided therethrough, said opening defining one end of said defroster duct and constructed for opening in said dashboard and for allowing light from the display of the indicator to pass out of said defroster duct through said opening in said dashboard such that both the defrost air and light from the display of the indicator pass from said opening in said dashboard so as to be reflected by the surface of the windshield, with the indicator light being reflected toward a viewing point of a driver so that the driver can see a virtual image of the display at a location in front of the windshield; and
   means for passing light from said indicator to the windshield surface via said defrost air passage, said passing means comprising a transparent face plate disposed upstream from said opening through the dashboard and is arranged between the indicator and the defrost air passage such that the face-plate constitutes part of the defroster duct, the display apparatus constructed such that defroster air in the defrost duct ascends along the surface of the face-plate and is blown at the surface of the windshield via the opening through the dashboard.

2. An automotive display apparatus according to claim 1, wherein said defroster duct is located rearwardly of the face plate with respect to a longitudinal direction of a vehicle; and said face plate is inclinedly installed with its front and rear portions raised and lowered, respectively.

3. An automotive display apparatus according to claim 1, wherein a front portion of said face plate is secured to an underside of the dashboard.

4. An automotive display apparatus according to claim 1, wherein said face plate is formed from a heat-resistant transparent acrylic resin.

5. An automotive display apparatus according to claim 1, wherein said face plate is formed of transparent glass.

6. An automotive display apparatus according to claim 1, wherein said defroster duct comprises a substantially vertical portion and a bent portion for directing defrost air at said transparent face plate.

7. An automotive display apparatus according to claim 6, wherein a rear end of said face plate is attached to said bent portion of said defroster duct.

* * * * *